(12) United States Patent
Breuer et al.

(10) Patent No.: US 10,797,834 B2
(45) Date of Patent: Oct. 6, 2020

(54) METHOD FOR TRANSMISSION OF DATA PACKETS IN A CELLULAR NETWORK

(71) Applicant: Gemalto M2M GmbH, Munich (DE)

(72) Inventors: Volker Breuer, Boetzow (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 18 days.

(21) Appl. No.: 16/309,967

(22) PCT Filed: Jun. 2, 2017

(86) PCT No.: PCT/EP2017/063527
§ 371 (c)(1),
(2) Date: Dec. 14, 2018

(87) PCT Pub. No.: WO2017/215962
PCT Pub. Date: Dec. 21, 2017

(65) Prior Publication Data
US 2019/0334658 A1   Oct. 31, 2019

(30) Foreign Application Priority Data

Jun. 17, 2016 (EP) .................................. 16175129

(51) Int. Cl.
H04L 1/18 (2006.01)
H04L 1/00 (2006.01)
H04L 1/16 (2006.01)

(52) U.S. Cl.
CPC .......... H04L 1/189 (2013.01); H04L 1/1671 (2013.01); H04L 1/1864 (2013.01); H04L 1/1893 (2013.01)

(58) Field of Classification Search
None
See application file for complete search history.

(56) References Cited

U.S. PATENT DOCUMENTS 9,380,642 B2 * 6/2016 Periyalwar ............ H04W 48/18
9,763,120 B2 * 9/2017 Yu ......................... H04W 76/15
(Continued)

OTHER PUBLICATIONS

International Search Report (PCT/ISA/210) dated Jul. 11, 2017, by the European Patent Office as the International Searching Authority for International Application No. PCT/EP2017/063527.
(Continued)

*Primary Examiner* — Justin R Knapp
(74) *Attorney, Agent, or Firm* — Buchanan Ingersoll & Rooney PC

(57) ABSTRACT

The present invention relates to a method for transmission of a data packet in a cellular network between a transmitting node and a receiving node, the receiving node being configured to receive data packets from the transmitting node, the transmitting node supporting at least one frequency band composed of a plurality of carriers, the method comprising for the transmitting node the step of transmitting to the receiving node a plurality of data transmissions of the data packet according to a predetermined redundancy level, whereby the first of the plurality of data transmissions is transmitted in a resource area addressed by a scheduling occurrence, and the rest of the plurality of data transmissions are transmitted in the same resource area as the first data transmission, and each data transmission is transmitted on a different carrier.

16 Claims, 3 Drawing Sheets

(56) References Cited

U.S. PATENT DOCUMENTS

2002/0069388 A1    6/2002  Niu et al.
2016/0119105 A1    4/2016  Jiang et al.

OTHER PUBLICATIONS

Written Opinion (PCT/ISA/237) dated Jul. 11, 2017, by the European Patent Office as the International Searching Authority for International Application No. PCT/EP2017/063527.

* cited by examiner

METHOD FOR TRANSMISSION OF DATA PACKETS IN A CELLULAR NETWORK

FIELD OF THE INVENTION

The present invention relates to a method for transmission of data packets between a transmitting node and a receiving node in a cellular network, in particular between a base node and a wireless communication device or vice versa.

The invention also pertains to a transmitting node using said method. The invention further relates to a receiving node operating with the transmitting node.

BACKGROUND OF THE INVENTION

In the area of wireless cellular communication the requirements from the user equipment side are getting stronger in particular in terms of reliability and latency resp. roundtrip time. For the coming technology standard of 5G a mode of ultra-reliable signalling is already supposed to be addressed. Here a availability of >99.9999%, which is an outage of less than an hour in a year, is foreseen. At the same time for all modes a roundtrip time (RTT) of a data packet is envisaged to remain below 1 ms. This roundtrip time for the data packet includes all latencies to the receiver, the transmitter, the air interface, and within the network.

Such requirements need in particular be fulfilled for critical applications in the machine type communication (MTC) area, in particular for telesurgery, industrial automation, emergency buttons or traffic safety.

By now an increase of reliability was solved by investing more time for repeated transmission, as it is known with the HARQ process concept in LTE. When a data packet was not decodable by the receiving node, e.g. the wireless communication device, a non-acknowledgement message was returned to the transmitting node, e.g. the base node resp. eNodeB, and the data packet was then transmitted again. Either alone or in combination of both transmissions this data packet was then decodable, or another NACK was sent, until the data packet can be decoded, or the data connection is that bad, that it eventually is skipped.

With the mentioned limitation of latency this option is not applicable anymore. Further as the latency requirement of <1 ms is hard to be reached, solutions were already envisaged for the coming technology standard to reduce the average roundtrip time which was in LTE in the area of 5 ms. It is therefore not a promising option, to look for further capabilities to squeeze the roundtrip time more, in order to allow repetitions according to the HARQ concept. Instead, each HARQ re-transmission adds another transmitter-air-interface-receiver-feedback loop to the overall RTT, whereas the aforementioned loop is just ~50% of the minimal RTT that is achievable.

On the other hand according to propagation conditions and signal to noise ratio it will in particular for high transmission rates be inevitable that a solution for not fully decodable received data packets is found.

Approaches to increase the transmission power is not an option due to the non-linear relation of required power and reception probability. In order to increase the reliability from 99.99% to 99.9999% the required power would need to be increased by several dB, which is not feasible. Hence, the only real option is via repeated transmission, where the probability that a transmission which is correctly received with 99.99% is failed two times equals 0.01%×0.01%, means the probability of correct reception after 2 transmissions achieves already 99.9999%. But by now an increase of reliability is payed off with an increase of latency due to the repeated transmission and feedback loop.

It is therefore the goal of present invention to find a solution for an improved data transmission scheme between nodes of a cellular network which fulfills both said reliability and latency requirements.

Further alternative and advantageous solutions would, accordingly, be desirable in the art.

SUMMARY OF THE INVENTION

For this it is according to a first aspect of the invention suggested a method for transmission of data packets in a cellular network between a transmitting node and a receiving node according to claim 1. In a second aspect it is suggested a method for receiving data transmissions according to claim 6. It is further suggested according to a third aspect of the invention a transmitting node according to claim 10. In a fourth aspect of the invention it is suggested a receiving node according to claim 13.

According the first aspect it is proposed a method for transmission of a data packet in a cellular network between a transmitting node and a receiving node, the receiving node being configured to receive data packets from the transmitting node, the transmitting node supporting at least one frequency band composed of a plurality of carriers, the method comprising for the transmitting node the step of transmitting to the receiving node a plurality of data transmissions of the data packet according to a predetermined redundancy level, whereby the first of the plurality of data transmissions is transmitted in a resource area addressed by a scheduling occurrence, and the rest of the plurality of data transmissions are transmitted in the same resource area as the first data transmission, and each data transmission is transmitted on a different carrier.

The transmitting node and the receiving node are nodes operating together over the air interface in a cellular network in particular by way of an active connection resp. packet data protocol (PDP) context for carrying out data transmissions.

In particular the transmitting node is a base node of the cellular network for downlink transmission, or the transmitting node is a wireless communication device operating with the base node for uplink transmission. Consequently in the downlink transmission the receiving node is the wireless communication device, and in uplink transmission the receiving node is the base node.

Preferably the base node and wireless communication device are supporting the technology standard of 4G resp. LTE or beyond. In this case the base node is an eNodeB.

The method relates in particular to the occurrence of a dedicated data transmission from transmitting node to the receiving node. The transmitting node is capable of supporting at least one frequency band composed of a plurality of carriers.

It is known that in LTE it was introduced the support of diverse frequency bands of different size. Hence on the physical layer, each frequency range comprises a varying amount of OFDM symbols, typically each comprising 12 subcarriers with a spacing of 15 kHz.

According to the inventive method, it is foreseen that the data packet is transmitted redundantly. That means that each data packet is cloned in a plurality of data transmissions, which are effectively carried out in parallel. In parallel does not necessary mean that each data transmission is started at exactly the same time, but it is not intended to distributed the data transmissions over separate frames.

Instead each data transmission is carried out on a separate carrier, wherein each carrier represents a single frequency. In particular the data transmissions are sent on separate subcarriers of at least one OFDM symbol, according to the LTE physical layer.

For doing so, first it is figured out what number of data transmissions is to be carried out. It is the goal to achieve the reliability targets for a certain transmission. However additionally it is the envisaged not to waste too much of the transmission capacity. Hence the determination of the number of data transmissions shall take all that into account. This is done by a redundancy level.

The redundancy level is a criterion from that the discrete number of data transmissions can be directly derived. In the simplest form the redundancy level in fact represents the number of data transmissions that shall be sent in parallel for one data packet.

According to preferred embodiment it is suggested that the initial redundancy level is determined by the base node by at least one out of the group of:
  considering propagation conditions determined during setup of a connection, and/or
  deriving from a quality of service requested by the wireless communication device.

Thus for the first data packet it needs to be figured out how often it will be transmitted. For this the initial redundancy level is determined.

One option is to analyze the propagation conditions and identify, to what extent data transmissions are interfered on the current air interface between transmitting node and receiving node. This determination step is in particular carried out by the base node, irrespective of the fact if the base node is transmitting or receiving node.

For that the base node analyses the propagation conditions in conjunction with the setup of the connection between the transmitting and the receiving node.

That does not necessary mean that each signalling carried out during connection setup is taken into account for estimating the initial redundancy level. A subset should also be sufficient, or a sample message directly after setting up of the connection.

The other mentioned option takes into account the quality of service requirement requested by the wireless communication device. Such quality of service comprises in particular the reliability and/or the latency requirements. Such quality of service measure may be a guaranteed bitrate (GPR). Depending upon the type of wireless communication device such requirements may differ. This is also possible by choice of network tariff, which may indicate different guaranteed quality of service levels.

Combinations of the both option are possible and advantageous, as for different quality of service different reliability needs are possible, which can depending upon the propagation conditions only be faced with a different redundancy level. That means the higher the reliability needs and the guaranteed bitrate requirements, the more data transmissions would be needed to comply with the requirements.

With the redundancy level eventually the number of data transmissions for the current data packet is identified. Now the data transmissions are carried out. That is done that way that at least two of the data transmissions for the respective data packet are transmitted in a resource area addressed by a scheduling occurrence. That scheduling occurrence is carrying the control channel elements addressing a specific resource in a frame resp. subframe. The second resp. the rest of the data transmissions is however carried out on a different carrier than the first data transmission.

With that it is advantageously achieved a parallelization of data transmissions without affecting the latency. The second and further data transmissions are carried out unconditionally, that is no feedback signal from the receiving node needs to indicate a bad reception, like it is the case in the 4G HARQ concept. Effectively the data transmissions could cover the whole frequency band, but it is preferably to define an upper maximum of data transmissions per data packet in order to achieve an acceptable data transmission rate for multiple data packets, and of course multiple wireless communication devices connected to one base node.

Preferably the transmitting node further transmits an indication about the number of data transmissions per data packet and a kind of identifier, like a packed identifier, that indicates that these data transmissions belong together. This is in particular part of the BCCH located in the master information block (MIB), that controls the scheduling in the uplink and downlink.

By now the redundancy level still is based on a best guess how many data transmissions per data packet are necessary. In order to improve this assessment for further data packets during a connection session it is proposed a method comprising the step of adapting the redundancy level in response to reception of a feedback signal concerning the reception of previously transmitted data packet from the receiving node, the feedback signal comprising a modification indication.

From the HARQ concept it is derived the approach to receive a feedback signal. This feedback signal is transmitted by the receiving node in response to receiving the data transmissions concerning one data packet. It is preferred to send just one feedback signal for one data packet, as in this case it is known if the data transmissions alone or in combination are useable for decoding the data packet.

The feedback signal in its simplest form comprises a binary information: ACK or NACK, that means the transmitted data packet is decodable or not.

According to this preferred embodiment however the feedback signal additionally comprises a modification indication. This modification indication is dedicated for modifying the redundancy level.

When the modification indication indicates an increase signal, then the redundancy level is increased that way that one more data transmission needs to be sent for the next data packet.

Consequently there are other possible values of the modification indication indicating a decrease and that a change of the redundancy level is not necessary.

In effect these modification indications all are part of the feedback signal that indicates successfully decoding the transmitted data packet.

According to another preferred embodiment it is however foreseen a method comprising the step of:
  increasing the redundancy level to the predetermined maximum and
  transmitting the same data packet in a number of data transmissions according to the new redundancy level in case of the feedback signal is indicating that the previously transmitted data packet could not be decoded by the receiving node.

This embodiment is relevant for the fact that the data packet could not be successfully decoded by the receiving node despite the plurality of data transmissions per data packet. Hence the receiving node sends a feedback signal comprising a NACK.

Receiving a NACK at the transmitting node results in an increase of the redundancy level to a predetermined maximum level. Thus a separate modification signal is not necessary according to this embodiment. This increase is a reaction that it turned out that the used redundancy level did not match to the signalling conditions during this very frame. Hence the previous assumptions are discarded and the redundancy level needs to be adjusted anew. This is started with the predetermined maximum redundancy level, leading to a maximum of data transmissions.

In particular the predetermined maximum redundancy level configured for a cellular network or cell is signaled by the base node as part of system information that are broadcasted to the camping wireless communication devices.

After increasing redundancy level resp. that resulting number of data transmission consequently the same data packet is transmitted again.

It is important in this case of a NACK not to finetune the redundancy level in terms of resource optimization, as already the latency requirement of 1 ms could not be matched. Therefore it is mandatory to assure that the unsuccessfully transmitted data packet is now reliably transmitted. Should this not be possible, it is an indication of a connection breakdown, and here other measures are necessary.

After the data packet is sent again by means of the plurality of data transmissions according to the maximum redundancy level, another feedback signal is received at the transmitting node, and then an adaption of the redundancy level will be carried out, which is about to affect the transmission of the next data packet in the transmission queue.

According to a second aspect of the invention it is suggests a method for a receiving node configured to receive data transmissions of data packets from a connected transmitting node according to first aspect of the invention, the transmitting node supporting at least one frequency band composed of a plurality of carriers, the method comprising the steps for the receiving node of:

- receiving in parallel the data transmissions of the data package, with each data transmission being transmitted on a different carrier,
- determine the ability to decode at least one received data transmissions, and
- sending to the transmitting node a feedback signal comprising a modification indication based on said determination step.

This aspect of the invention relates to the handling of data packet transmission according to the first aspect of the invention at the receiving node side.

When a data packet is transmitted in a plurality of effectively parallel data transmissions the receiving node needs to cope with that.

Typically a receiving node, in particular the wireless communication device, is capable to receive and process the whole frequency band within one frame. The receiving node thus figures out that at least two data transmissions on different subcarriers complement to the same data packet. This is in particular indicated in the BCCH located in the MIB of the frequency band.

After reception it is for the receiving node therefore the next task to determine if the data transmissions can be decoded. The decoding is preferably possible by successfully decoding one of the received data transmissions.

Alternatively two or more data transmissions concerning one data packet can also be combined, if it is not possible to decode the received data transmission alone.

Through the structure of a data transmissions, including checksums and other measures for increasing the reliability, it is possible to figure out if one data transmission was successfully decoded, and if not where an issue might be located. Typically with two or more data transmissions sufficient signals are available, where for each section of the data packet a reliable or derivable representation is part of at least one data transmission.

Depending on the outcome of this determination step the receiving node transmits a feedback signal to the originally transmitting node comprising a modification indication.

If the data packet could not be decoded, the feedback signal comprises a NACK. A further modification indication is not mandatory. According to a preferred embodiment it is suggested that the modification indication relates to an increase of the redundancy level to the predetermined maximum redundancy level in case the received data packet was not successfully decoded.

If the data packet could be decoded, the feedback signal indicates in the modification indication how the receiving node suggests a modification of the redundancy level. This is advantageous as by this measure the transmitting node gets an up to date indication about the reliability of the transmission.

In particular it is suggested that the modification indication relates to an increase of redundancy level in case the received data packet is only decodable after combination of at least two received data transmissions.

This modification indication suggests an increase of the redundancy level when no data transmission alone could be successfully decoded. It would therefore be safe to receive at least one data transmission that alone could be decoded. With only a small degradation of the reception condition consequently the reliability could be put at risk. Hence it is advantageous in this situation when the transmitting node would increase the redundancy level. It is further suggested that the modification indication relates to a decrease of redundancy level in case the received data transmissions all are decodable alone and the redundancy level is above a predetermined floor value.

With this embodiment it is related to the other corner of reception quality. That is all data transmissions could be decoded. Generally this is the case when a plurality of data transmissions were received and each of them could be decoded alone. For the sake of saving transmission capacity it is therefore advantageous to further reduce the redundancy level in this case. But this is only true at a certain floor value in terms of data transmissions.

It needs to be evaluated—also in the light of requested quality of service—if this floor value complements to one data transmission, which is the obvious lower boundary, or a higher value. When a high reliability of 99.9999% is requested, then it would be save to transmit at least two data transmissions per data packet, even if continuously both data transmissions can be decoded.

Preferably in all other cases the modification indication suggests not to amend the redundancy level for data transmissions. There are possible options that in case of a high redundancy level, when a certain number of data transmissions could be decoded alone, but one data transmission could not be decoded alone, that a reduction of the redundancy level might nevertheless be reasonable. Such fine tuning of the feedback mechanism is in particular useful to implement in case of limited available resources in the scheduling of the frequency band, in particular in case of downlink signalling, where a plurality of wireless communication devices are served in parallel.

According to the third aspect of the invention it is suggested a transmitting node, comprising transmission circuitry for wirelessly transmitting data packages to a connected receiving node in a frequency band composed of a plurality of carriers, and a receiving circuitry for receiving a feedback signal from the receiving node, the transmitting node is configured to transmit a plurality of data transmissions of the data packet according to a predetermined redundancy level, within the same frame, whereby the first of the plurality of data transmissions is transmitted in a resource area addressed by a scheduling occurrence, and the rest of the plurality of data transmissions are transmitted in the same resource area as the first data transmission, and each data transmission is transmitted on a different carrier.

This aspect shares the advantages of the first embodiment. The transmitting node is a node operating in resp. with a cellular network, so it is either a base node or a wireless communication device, in particular supporting the technology standard of LTE or beyond.

The transmitting node comprises circuitry for wireless transmitting data packages and receiving circuitry. Typically both circuitry is implemented in a transceiver which is configured to manage both operations. Circuitry for wireless transmitting and receiving circuitry are both connected to an antenna and typically provide further elements. Preferably in case of a wireless communication device such transceiver is part of a M2M module, also known as radio communication terminal, which encompasses all functionality related to the connectivity, while other functions are handled by general purpose circuitry in the node.

According to the fourth aspect of the invention it is suggested a receiving node comprising receiving circuitry for receiving data transmissions of data packages transmitted by a connected transmitting node for wirelessly transmitting data packages in a frequency band composed of a plurality of carriers, a transmission circuitry for transmitting a feedback signal to the transmitting node, and processing circuitry for handling received data transmissions of data packages, wherein the receiving circuitry is configured to receive in parallel the data transmissions of the data package, with each data transmission being transmitted on a different carrier, the processing circuitry is configured to determine the ability to decode at least one received data transmission, and the transmission circuitry is configured to send to the transmitting node a feedback signal comprising a modification indication based on the determination of the processing circuitry.

This aspect shares the advantages of the second aspect of the invention. The receiving node may—complementing the transmitting node—be either a wireless communication device or a base node. It is equipped with receiving and transmission circuitry for which the same applies as for the transmitting node.

Preferably both a wireless communication device and a base node may be configured that way that it—depending upon the signalling direction, downlink or uplink—may take both the role of the transmitting node and the receiving node. Consequently transmission circuitry and receiving circuitry are the same.

As it is shown this invention advantageously solves the depicted problem of high availability with reduced latencies for the coming technology standard.

Some or all of the functions of present invention may be implemented using hardware circuitry, such as analog and/or discrete logic gates interconnected to perform a specialized function. Additionally, some or all of the functions may be implemented using software programs and data in conjunction with one or more digital microprocessors. Where nodes that communicate using the air interface are described, it will is acknowledged that those nodes have suitable radio communications circuitry. Moreover, the hardware can additionally be considered to be provide any form of computer-readable memory, volatile or non-volatile, containing an appropriate set of computer instructions that would cause a processor to carry out the functions described herein.

Hardware implementations of the present invention may comprise, without limitation, digital signal processor (DSP) hardware, a reduced instruction set processor, hardware circuitry including but not limited to application specific integrated circuit(s) (ASIC) and/or field programmable gate array(s) (FPGA(s)) capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a message flow between a transmitting node TN and a receiving node RN according to the currently defined HARQ concept in 4G according to prior art. Transmitting node is preferably an eNodeB in downlink transmission, and the receiving node a wireless communication device.

Figure 1:
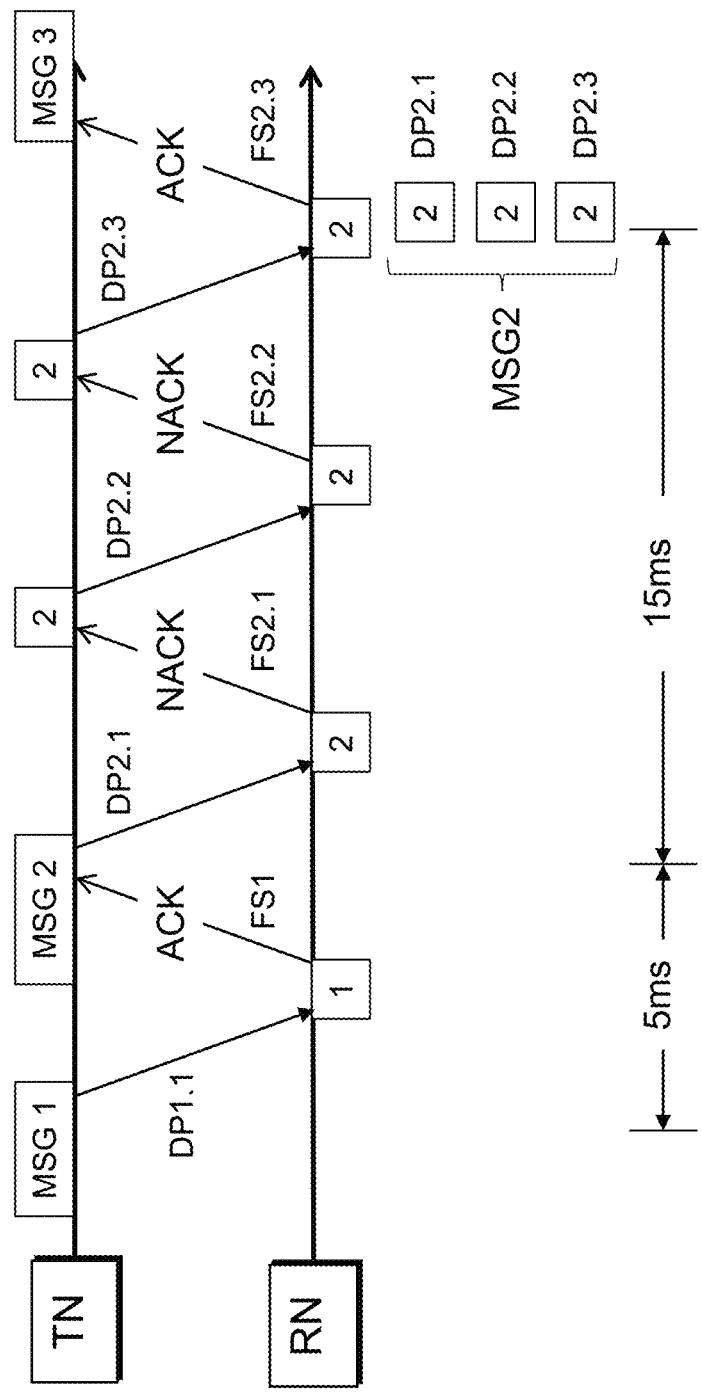
FIG. 1 represents a schematic message flow between transmitter and receiver according to the prior art in 4G.

Here the concept is based on the idea that a data packet, which is transmitted from the transmitting node, is evaluated by the receiving node, and with a feedback signal it is indicated if the data packet could be decoded or not. This result is indicated in the feedback signal with an ACK/NACK signal (acknowledgment, non-acknowledgment), and in case of a NACK, the data packet is transmitted again.

This can be seen in the shown exemplary message flow. It starts with the transmitting node that wants to transmit a first message MSG1. MSG1 is for simplicity reason understood as one data packet.

The transmission is carried out with a first instance of the data packet DP1.1, which is sent to the receiving node RN.

At the receiving node RN it is after reception analyzed if message MSG1 can be decoded from the transmitted data packet DP1.1. For figuring out, if the transmission was successful measures like checksums are used.

In this case the data packet DP1.1 could be decoded. Hence, the receiving node RN transmits a feedback signal FS1, in this case with an ACK. So, the transmitting node after reception of the feedback signal knows, the transmission of message MSG1 was successful. For this transmission and feedback signal cycle it was needed a duration of 5 ms.

So the transmitting node moves on in the transmission queue. As next it is another message MSG2 to be sent. This is carried out with a first data packet DP2.1. This time, the receiving node RN was not able to reliably decode this message. Consequently it sends with feedback signal FS2.1 a NACK.

After receiving a NACK the transmitting node is aware of the unsuccessful transmission of data packet DP2.1, hence it is needed to send the message MSG2 again, this time in data packet DP 2.2. This time the receiving node does not only try to decode data packet DP 2.2, but a combination of data packet DP2.1 and DP2.2. If both data packets cannot be decoded alone, it is at least possible to detect where both data packets differ. With a replacement of the decoded parts it might be possible that the correct message MSG2 could be reconstructed, which would be indicated by a matching to the checksum.

In this case also with the second data packet DP2.2 the decoding is not successful.

Hence another feedback signal FS2.2 comprising a NACK indication is sent to the transmitting node TN, which consequently sends another data packet DP2.3 for this message MSG2. Preferably subsequent data packet transmissions are carried out with a higher transmission power.

Now, after combining data packets DP2.1, DP2.2 and DP2.3, the receiving node RN is able to decode the message MSG2, which is indicated with a NACK message in feedback signal FS2.3 to the transmitting node, which then would continue with the next message MSG3.

Receiving this message MSG2 took three times the duration than for MSG1, due to the repetitions. In theory even more repetitions might happen. Even if transmitting one data packet would match the latency requirements, after continuous repetitions according to the HARQ process the envisaged latency requirements would by far not be met.

Figure 2:
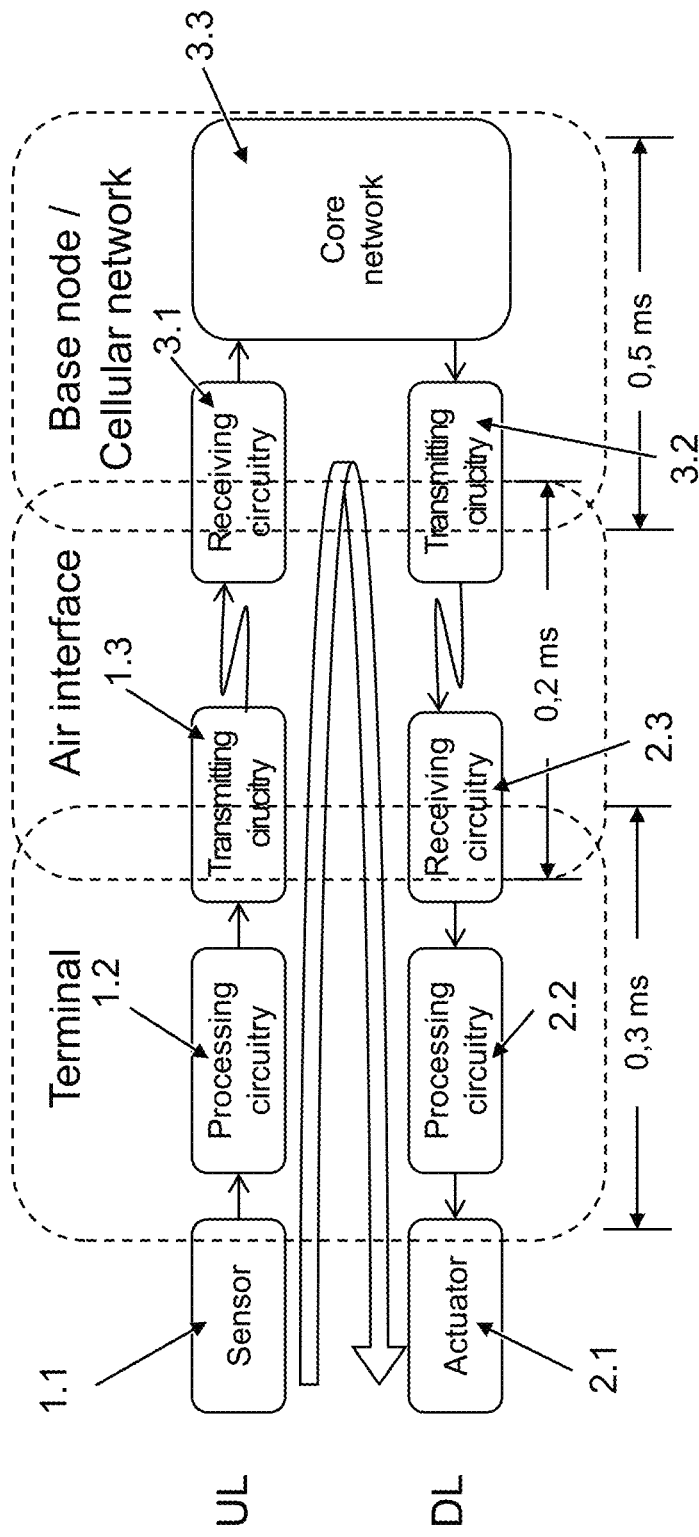
FIG. 2 represents a detailed flow between transmitter and receiver of one data transmission with time measures according to the prior art envisaged for 5G.

FIG. 2 shows that the latency requirements of 5G are hardly possible to be further squeezed. Here a wireless communication device, in particular a terminal, like a MTC device, sends a message to another terminal. In this figure it is shown in detail which components on terminal side, air interface and network side are involved. Hence, in the upper row the uplink communication path UL is shown and in the lower row the downlink communication path DL. On the terminal side it starts in this exemplary embodiment with a sensor 1.1, that is the place where the data message content is created. This is in particular the case for a MTC device like a home security device. With this sensor it is detected in particular a suspicious movement, which triggers a message to another terminal, e.g. a mobile handset of the owner of the home security system.

The triggering and the creation of the message is not part of the latency, but when the application part of the terminal instructs the communication part of the terminal, e.g. a M2M module, to send the message, then it requires some embedded computing in the processing circuitry 1.2 of the terminal. Here the message is packet and then forwarded to the transmitting circuitry 1.3, which is the entry point to the air interface.

Transmission over the air interface typically takes alone 0.1 ms until the receiver 3.1 of the cellular network's base station, where the terminal is camping on, receives the transmission. The receiver of the base node decodes the transmission and forwards it to the core network or other parts of the cellular network that cares for forwarding to the destination terminal device.

On the way back to the destination terminal device on the downlink communication path DL the transmitter 3.2 of the base station, where the destination terminal device is camping on, is instructed to send the message and sends it over the air interface.

At the receiving circuitry 2.3 of the receiving terminal the message is received and processed and then handled in the processing circuitry 2.2 until it is forwarded to the actuator 2.1 of the destination terminal, e.g. a user interface or signal.

As it can be seen, in total the cellular network needs for receiving, processing and sending the data packet via base node and core network alone a total of 0.5 ms. As pointed out, the pure air interface part requires per direction 0.1 ms, which totals for a round trip to 0.2 ms. Finally the terminal requires in total for processing and sending plus receiving and processing a total of 0.3 ms. If this is equally shared between sending and receiving terminal is likely but not mandatory. It can be seen that just for sending of one message from a wireless communication device to the base node and vice versa a total of 1 ms is required.

Should an error management like known from the prior art as shown in FIG. 1 would now be applied, the 1 ms latency goal cannot be held; instead the time of 1 ms will be needed for each repetition.

Figure 3:
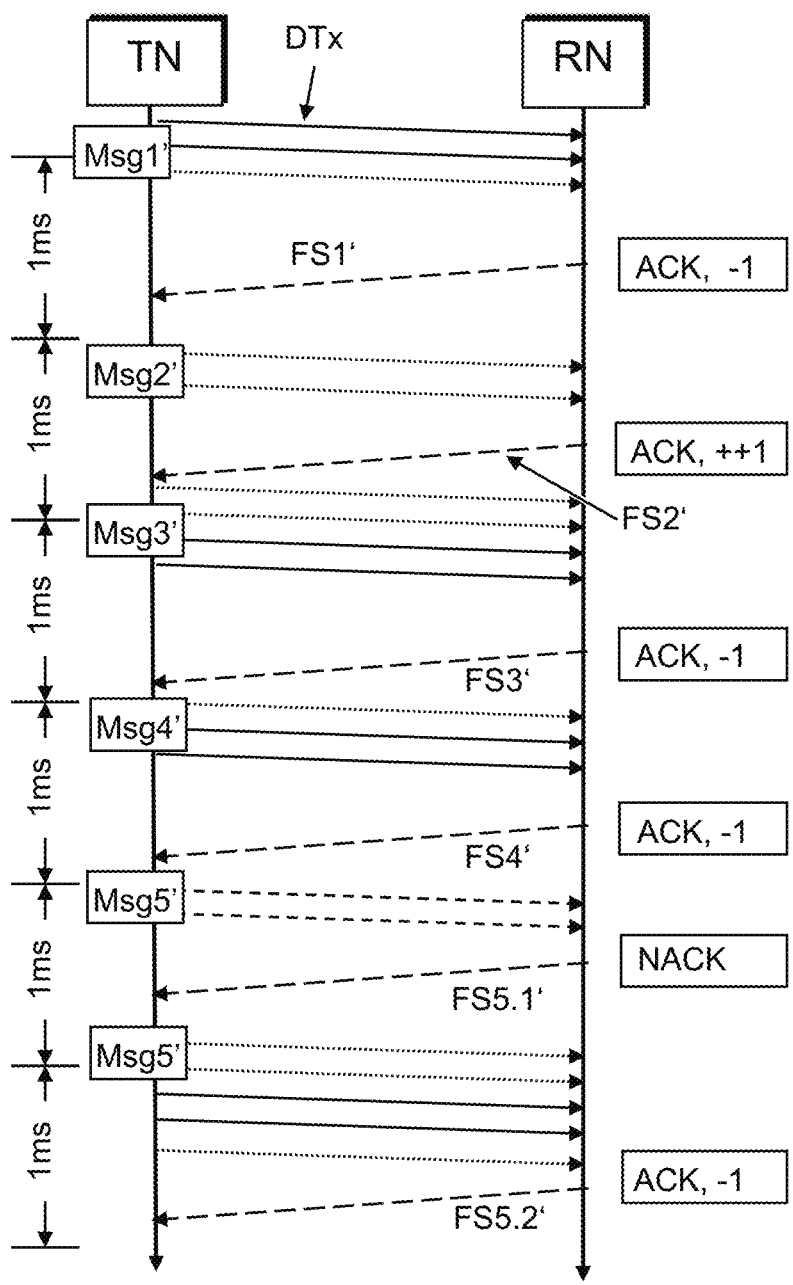
FIG. 3 shows a schematic message flow between transmitter and receiver according to an exemplifying embodiment of present invention.

It therefore requires another solution, which is shown by means of an exemplary embodiment as shown in FIG. 3.

It again starts with a transmitting node TN and a receiving node RN, in particular a base node wants to send downlink a plurality of data packets to a camping wireless communication device, or a wireless communication device wants to send a plurality of data packets uplink to a base node of a cellular network it is operating with. For a roundtrip according to FIG. 2 both directions are necessary, for simplicity reasons only one direction is described.

The operation starts with a first data packet which complements to a message MSG1' which is about to be sent. This is the first message during this connection, which was setup right before.

During setup the base node, in this example the transmitting node TN, evaluates preferably based on propagation conditions an initial redundancy level. In this exemplifying and simplifying embodiment the redundancy level is an integer that depicts the number of data transmissions per data packet. The determination step indicates that with three data transmissions the data packet should reliably be decoded by the receiving node RN.

Consequently the data packet MSG1' is then transmitted by means of three data transmissions DTx in parallel by the transmitting node to the receiving node. Transmitting in parallel means, that the data transmissions are sent within the same resource area which is addressed by a scheduling occurrence. That is in particular the same control channel element which addresses a specific resource in a frame resp. subframe. But the data transmissions are carried out on different carriers, that means on different frequencies of the supported frequency band.

The receiving node RN consequently receives in parallel the data transmissions.

As it turns out during determination of the ability to decode the received data transmissions, two of the three data transmissions are received very well, and only one shows a degradation which does not allow decoding of this data transmission alone. But that is not necessary, as two of the data transmissions can be decoded alone, therefore it does not require a combination of the third data transmission with another data transmission.

After this determination step the receiving node is configured to send to the transmitting node a feedback signal FS1'. Such feedback signal is supposed to indicates on the one hand if the data transmission could be decoded successfully, and on the other hand how the redundancy value shall be changed.

The latter is achieved with sending a modification indication with the feedback signal. For that the receiving node evaluates the reception capability of the data transmissions and following given criteria determines a modification indication that indicates an increasing, decreasing or unchanged redundancy level.

In this case two of three data transmissions are decodable alone. Generally it is the rule that if all data transmissions can be decoded alone, a reduction of the redundancy level is to be indicated. In this case of MSG1' we have however three data transmissions, where two of them are decodable. In particular in the light of limited frequency resources it is then preferably to already reduce the redundancy level, when at least two data transmissions can be decoded alone. Further a floor level needs to be considered. When all data transmissions can be decoded, but only two data transmission have been carried out, it is risky to further reduce the redundancy level, in particular when a certain reliability is requested.

Hence a floor value of two should not be undercut. That means when only two data transmissions are available, at least no further reduction of the redundancy level is carried out, no matter how good the two data transmissions could be decoded.

So in case of MSG1' the receiving node sends a feedback signal with an ACK, and a modification indication of a reduction of the redundancy level.

In particular the feedback signal with modification indication could comprise 2 bits, with the following meaning of each possible value:
  00: NACK
  01: ACK+ (increase)
  10: ACK+/− (no change)
  11: ACK− (decrease)

Other ways of coding are possible, in particular for allowing more variants of modification signals, like an increase/decrease by more than one (ACK++, ACK−−).

After reception of the feedback signal FS1', the transmitting node TN evaluates the received feedback signal and acts accordingly. That an ACK is indicated means, that the data packet MSG1' is successfully transmitted, so the next data packet in the transmission queue can be sent. The modification indication indicating a reduction of the redundancy level leads to a reduction of the redundancy level from 3 two 2.

Consequently the next data packet MSG2' is then transmitted considering the redundancy level, that means only two data transmissions DTx are sent.

At the receiving node RN the data transmissions DTx are received and analyzed. I turns out that none of the two data transmissions can be decoded alone. That means a combination of both needs to be carried out. The combination is working like the combination of the MSG2 instances in FIG. 1. So the same rules apply, with the distinction that the data transmissions in this example were transmitted in parallel.

The general rule for determining the modification indication is, that if the data transmissions cannot be decoded alone, then this results in a modification indication indicating an increase of the redundancy level.

According to this exemplifying embodiment it is further taken into account, that the number of data transmissions were already matching the floor value of 2. In this case it is therefore foreseen in this preferred embodiment, to indicate an increase of the redundancy level of more than one.

In particular with high reliability requirements this increase is preferable, therefore the feedback signal FS2' indicates an ACK and a modification indication of '++', that is an increase by two.

The transmitting node TN takes this feedback signal into account, moves ahead to the next data packet MSG3' and sends in parallel data transmissions according to the new redundancy level of 4.

The receiving node RN receives these data transmissions and figures out, that again two data transmissions could be decoded alone, and two more data transmissions were sent. So, the feedback signal FS3' comprises, besides the ACK, a modification indication of '−', that means a reduction of the redundancy level by one.

The transmitting node TN consequently sends the next data packet MSG4' according to the modified redundancy level of three, which results in the same configuration as for MSG1'. In this case two data transmissions can be decoded alone at the receiving node RN, and still another data transmission is available. Therefore a feedback signal FS4' with an ACK and a modification indication of '−', that means a decrease of redundancy level is sent to the transmitting node TN.

Transmitting node TN takes this feedback signal FS4', moves on to the next data packet MSG5' and reduces the redundancy level again to two.

The two parallel data transmissions for MSG5' are then received at receiving node RN. But in this case, the data transmissions cannot be decoded, neither alone nor in combination. Obviously a massive degradation of propagation conditions appeared in the meantime.

Hence the receiving node sends a feedback signal FS5.1' with an NACK, which indicates that the data packet MSG5' could not be decoded.

In response the transmitting node increases the redundancy level to the maximum value, which is in this exemplary embodiment a level of 5. In this embodiment it requires no separate modification indication with the feedback signal, that shows the transmitting node how to increase the redundancy value. However, this would also be a possible way of operating.

The transmitting node TN considers the NACK as the need to resend data packet MSG5', but now with the new redundancy level. Consequently five data transmissions DTx are sent in parallel and received and decoded at the receiving node RN. Now the receiving node successfully decodes the data transmissions and therefore sends another feedback signal FS5.2', which indicates the successful decoding and another adaptation of the redundancy level.

This example shows the advantages of the invention and that the addressed problem is solved. With a reduction of the roundtrip time to 1 ms as indicated in FIG. 2 it is for the majority of data packets assured that the 1 ms latency is not exceeded.

Further detailed fine tuning measures are available, in particular an increase of the floor level, a maximum redundancy level and more careful reduction of redundancy level, which may result in a higher use a frequency resources, but allowing that higher reliability levels can be achieved by maintaining the 1 ms latency target.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for transmission of a data packet in a cellular network between a transmitting node and a receiving node, the receiving node being configured to receive data packets from the transmitting node, the transmitting node supporting at least one frequency band composed of a plurality of carriers, the method comprising:
    transmitting, by the transmitting node to the receiving node, a plurality of data transmissions of the data packet according to a predetermined redundancy level, whereby a first of the plurality of data transmissions is transmitted in a resource area addressed by a scheduling occurrence, and a remainder of the plurality of data transmissions are transmitted in a same resource area as the first data transmission, wherein each data transmission is transmitted on a different carrier;
    receiving, in parallel by the receiving node, the data transmissions of the data packet;
    determining, by the receiving node, an ability to decode at least one of the received data transmissions based on whether the at least one received data transmission is decodable alone without combination with data of another one of the received data transmissions; and
    sending, by the receiving node to the transmitting node, a feedback signal comprising a modification indication indicating whether to modify the predetermined redundancy level based on said determination step.

2. The method according to claim 1,
    wherein the transmitting node is a base node of the cellular network for downlink transmission, or
    the transmitting node is a wireless communication device operating with the base node for uplink transmission.

3. The method according to claim 2,
    wherein the predetermined redundancy level is determined by the base node by at least one out of the group of:
        considering propagation conditions determined during setup of a connection, or
        deriving from a quality of service requested by the wireless communication device.

4. The method according to claim 1,
    further comprising modifying, by the transmitting node, the predetermined redundancy level in response to reception of the feedback signal.

5. The method according to claim 4,
    further comprising:
        increasing a redundancy level from the predetermined redundancy level to a predetermined maximum redundancy level; and
        transmitting a same data packet in a number of data transmissions according to the predetermined maximum redundancy level in case of the feedback signal indicating that at least one of the previously transmitted data packets in the at least one of the received data transmissions could not be decoded alone by the receiving node.

6. The method according to claim 1, wherein the transmitting node supports at least one frequency band composed of a plurality of carriers,
    the method further comprising:
        transmitting, in parallel by the transmitting node, the data transmissions of the data packet, with each data transmission being transmitted on a different carrier of the plurality of carriers and on a different frequency in the at least one frequency band.

7. The method according to claim 1,
    wherein the modification indication relates to an increase of redundancy level in case the received data packet is only decodable after combination of at least two received data transmissions.

8. The method according to claim 1,
    wherein the modification indication relates to a decrease of redundancy level in case the received data transmissions all are decodable alone and the predetermined redundancy level is above a predetermined floor value.

9. The method according to claim 1,
    wherein the modification indication relates to an increase of redundancy level to a predetermined maximum redundancy level in case the received data packet was not successfully decoded.

10. A transmitting node, comprising
    transmission circuitry for wirelessly transmitting data packages to a connected receiving node in a frequency band composed of a plurality of carriers, and a receiving circuitry for receiving a feedback signal from the receiving node,
    the transmitting circuitry is configured to:
        transmit, to the receiving node, a plurality of data transmissions of the data packet according to a predetermined redundancy level, within a same frame,
        transmit, to the receiving node, a first of the plurality of data transmissions in a resource area addressed by a scheduling occurrence,
        transmit, to the receiving node, a remainder of the plurality of data transmissions in a same resource area as the first data transmission, wherein each data transmission is transmitted in parallel and on a different carrier;
    wherein the receiving circuitry is configured to receive from the receiving node a feedback signal comprising a modification indication indicating whether to modify the predetermined redundancy level based on a determination by the receiving node of an ability to decode at least one of the received data transmissions based on whether the at least one received data transmission is decodable alone without combination with data of another one of the received data transmissions.

11. The transmitting node according to claim 10,
    further comprising a processing circuitry configured to modify the predetermined redundancy level in response to reception of the feedback signal.

12. The transmitting node according to claim 11,
wherein the processing circuitry is further configured to:
increase a redundancy level from the predetermined redundancy level to a predetermined maximum redundancy level; and
transmit a same data packet in a number of data transmissions according to the predetermined maximum redundancy level in case the feedback signal indicates that at least one of the previously transmitted data packets in the at least one of the transmitted data transmissions could not be decoded alone by the receiving node.

13. A receiving node comprising
receiving circuitry for receiving data transmissions of data packages transmitted by a connected transmitting node for wirelessly transmitting data packages in a frequency band composed of a plurality of carriers,
a transmission circuitry for transmitting a feedback signal to the transmitting node,
and processing circuitry for handling received data transmissions of data packages,
wherein the receiving circuitry is configured to receive in parallel the data transmissions of the data package, with each data transmission being transmitted on a different carrier according to a predetermined redundancy level,
the processing circuitry is configured to determine an ability to decode at least one of the received data transmissions based on whether the at least one received data transmission is decodable alone without combination with data of another one of the received data transmissions, and
the transmission circuitry is configured to send to the transmitting node the feedback signal comprising a modification indication indicating whether to modify the predetermined redundancy level based on said determination.

14. The receiving node according to claim 13,
wherein the processing circuitry is configured to determine the modification indication indicating an increase of redundancy level in case the received data packet is only decodable after combination of at least two received data transmissions.

15. The receiving node according to claim 13,
wherein the processing circuitry is configured to determine the modification indication indicating a decrease of redundancy level in case the received data transmissions all are decodable alone and the redundancy level is above a predetermined floor value.

16. The receiving node according to claim 13,
wherein the processing circuitry is configured to determine the modification indication indicating an increase of redundancy level to a predetermined maximum redundancy level in case the received data packet was not successfully decoded.

* * * * *